United States Patent

Park et al.

[11] Patent Number: 5,600,507
[45] Date of Patent: Feb. 4, 1997

[54] POWER TRANSMISSION DEVICE FOR TAPE RECORDER

[75] Inventors: Gun C. Park; Do Y. Choi; Ohashi Masaharu; Jae K. Seo, all of Suwon, Rep. of Korea

[73] Assignee: Samsung Electronics Co., Ltd., Kyungki-Do, Rep. of Korea

[21] Appl. No.: 526,864

[22] Filed: Sep. 12, 1995

Related U.S. Application Data

[63] Continuation of Ser. No. 165,299, Dec. 13, 1993, abandoned.

[30] Foreign Application Priority Data

| Dec. 11, 1992 | [KR] | Rep. of Korea | 92-23944 |
| Dec. 11, 1992 | [KR] | Rep. of Korea | 92-23945 |
| Feb. 26, 1993 | [KR] | Rep. of Korea | 93-2765 |

[51] Int. Cl.$^6$ .................................................. G11B 5/027
[52] U.S. Cl. .................................................. 360/85
[58] Field of Search .................................... 360/85, 95

[56] References Cited

U.S. PATENT DOCUMENTS

| 4,221,316 | 9/1980 | Jenkins et al. | 226/35 |
| 4,594,624 | 6/1986 | Kanchiku et al. | 360/85 |
| 4,635,146 | 1/1987 | Koda et al. | 360/85 |
| 4,930,720 | 6/1990 | Hwang | 242/198 |
| 5,450,258 | 9/1995 | Kwon | 360/85 |
| 5,508,858 | 4/1996 | Park et al. | 360/85 |

FOREIGN PATENT DOCUMENTS

| 58-153255 | 9/1983 | Japan | 360/85 |
| 4-283453 | 10/1992 | Japan |  |

*Primary Examiner*—Stuart S. Levy
*Assistant Examiner*—Allen Cao
*Attorney, Agent, or Firm*—Sughrue, Mion, Zinn, Macpeak & Seas

[57] ABSTRACT

A power transmission device for a tape recorder, which is capable of easily transmitting power to a tape loading unit or a reel table system, includes a loading system driving gear for transmitting power to the tape loading unit to thereby position a tape with respect to a drum, and a reel-system driving gear for driving the reel table system, in which the gears are selectively driven to receive power from the capstan motor via transmission and rotating gears operated by a magnetic force and a spring. By driving the tape loading unit and reel tables with the capstan motor, one motor can be removed to further minimize deck size.

18 Claims, 8 Drawing Sheets

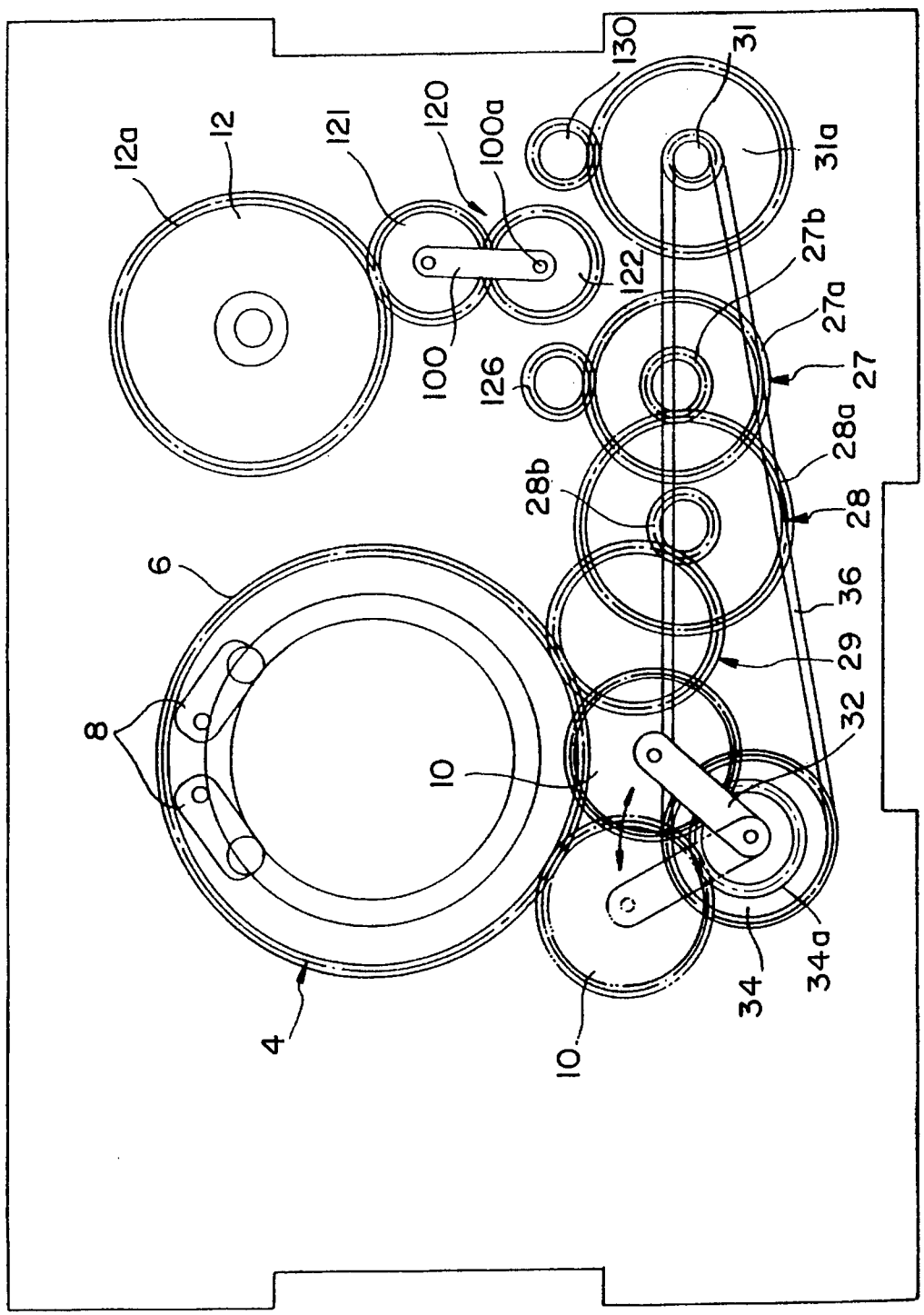

POWER TRANSMISSION DEVICE FOR TAPE RECORDER

This is a Continuation of application Ser. No. 08/165,299 filed Dec. 13, 1993, now abandoned.

BACKGROUND OF THE INVENTION

1. Field of the Invention

The present invention relates to a tape recorder, e.g., a tape recorder associated with video cassette recorders and camcorders. More specifically, the present invention is related to a power transmission device for selectively transmitting the rotational force produced by a capstan motor to loading and reel systems.

2. Description of the Prior Art

Generally, tape recorders for recording or reproducing signals from a magnetic tape, which tape moves along a predetermined path, have units or subsystems such as a drum with heads on a deck, a tape moving system for moving the tape seated on reel tables, a tape loading system for closely contacting the tape with the side of the drum, and a reel-table driving system.

Various arrangements of loading systems and reel table systems are disclosed in co-pending and commonly assigned U.S. patent application Ser. No. 08/005,445 and PCT Application No. PCT/KR93/00026, both of these references being incorporated herein for all purposes by reference. FIG. 9, corresponding to application FIG. 3 in Ser. No. 08/005,445, illustrates generally a reel table system consisting of a supply reel 110 and a take-up reel 120 mounted on opposite sides of the sub-deck 200.

The conventional tape recorder separately includes a loading motor for driving the tape loading unit and a capstan motor for driving the reel tables. For example, the main deck 100 in the above-identified application includes both a loading motor 30 and capstan motor 40.

However, the tape recorder is gradually being made smaller. Thus, the deck size must be further minimized to produce a subminiature camcorder, e.g., a pocket sized tape recorder. Despite this requirement, the conventional tape recorder still has the loading motor, for contacting the tape with the drum on the deck, as well as the capstan motor, for moving the tape and driving the reel tables. In short, the deck is limited in size, and exceeds an optimal weight.

SUMMARY OF THE INVENTION

The principal object of the present invention is to solve the above-described problems.

An object according to the present invention is to provide a power transmission device for a tape recorder, wherein power produced by a capstan motor is selectively provided for loading a tape and for driving reel tables. Since power is transmitted from a single motor, i.e., without requiring an additional loading motor, the tape recorder's structure advantageously can be simplified.

These and other objects, features and advantages according to the present invention are provided by a power transmission device for a tape recorder which couples power from a capstan motor both to a tape loading system for positioning a tape with respect to a drum and to a reel table system. The power transmission device according to the present invention includes a power transmission gear rotating forward and backward in response to rotation by a capstan motor, a rotating gear for swinging at a predetermined angle around a shaft by being brought into meshing engagement with the transmission gear, and a first power driving unit having a first gear mounted on a deck for transmitting rotational force from the capstan motor to the loading system by being selectively brought into meshing engagement with the rotating gear. Additionally, a second power driving unit includes a relay gear mounted on the deck for transmitting the rotational force of the capstan motor to the reel system by being selectively brought into meshing engagement with the rotating gear. A positioning controller prevents the rotating gear from being deviated when one of the first and the second power driving units is being driven by the power transmission device.

Preferably, the transmission gear of the power transmission device has a first gear in meshing engagement with a gear of the capstan motor, and a second gear in meshing engagement with a first gear of the rotating gear. Moreover, the rotating gear has a first gear being brought into meshing engagement with a second gear of the transmission gear and either the first gear of the first power driving unit or the relay gear of the second power driving unit, selectively. The power transmission device further has a swing arm connecting the transmission gear to the rotating gear, which swing arm is swung around a fixed shaft by the position controller.

The power transmission device advantageously is provided with a lever which connects the transmission gear, which is in meshing engagement with the rotating gear, and a pin which projects from the upper end of the lever at the rotating gear side.

The first power driving unit has a series of decelerating gears consisting of a plurality of gears consecutively arranged for receiving power from the rotating gear to thereby drive the tape loading system. Meanwhile, the second power driving unit is constructed such that the relay gear receives the power from the power transmission device, which relay gear is directly coupled to a driving pulley, which, in turn, is coupled to a driven pulley via a timing belt for transmitting the power from the relay gear to an idler gear.

According to the present invention, a preferred embodiment of the position controller has a driving coil mounted on a substrate, and a plunger connected to a permanent magnet opposite to the driving coil and spaced apart therefrom by a predetermined distance, so that the plunger swings around the shaft against spring tension to regulate the position of the lever of the rotating gear and, consequently, the rotating gear.

Preferably, the plunger includes a latch plate on one end of an arm extending to one side thereof to control the position of the projecting pin formed on the lever. Therefore, the plunger can swing around a pivot shaft for releasing the locking of the projecting pin position by the latch plate when the power is applied to the driving coil so as to control the position of the projecting pin using the restoring force of the spring when the power is turned off.

Preferably, the position controller has a shaking lever rotatably connected to the end of a lever projecting on one side of the swing arm of the power transmission device via a pin, a permanent magnet for swinging the shaking lever through a predetermined angle, a spring connected to one end of the lever of the swing arm and one end of the shaking lever, and a electromagnetic member having its first and second ends close to the permanent magnet of the shaking lever. According to a preferred embodiment of the present invention, the electromagnetic member is formed of a body mounted on the substrate, and the driving coil wound around the body for supplying a predetermined current, so that the magnetic orientation of the first and second ends is determined by current polarity.

BRIEF DESCRIPTION OF THE DRAWINGS

The above objects and other advantages of the present invention will become more apparent by describing in detail a preferred embodiment thereof with reference to the attached drawings wherein like or similar elements are indicated by like or similar numbers and wherein:

FIGS. 3A and 3B are plan views of respective operational states of the power transmission device shown in FIG. 1 while

FIG. 4 is a schematic plan view showing the deck for illustrating a second embodiment of the power transmission device of the tape recorder according to the present invention;

DETAILED DESCRIPTION OF THE PREFERRED EMBODIMENTS

Figure 1:
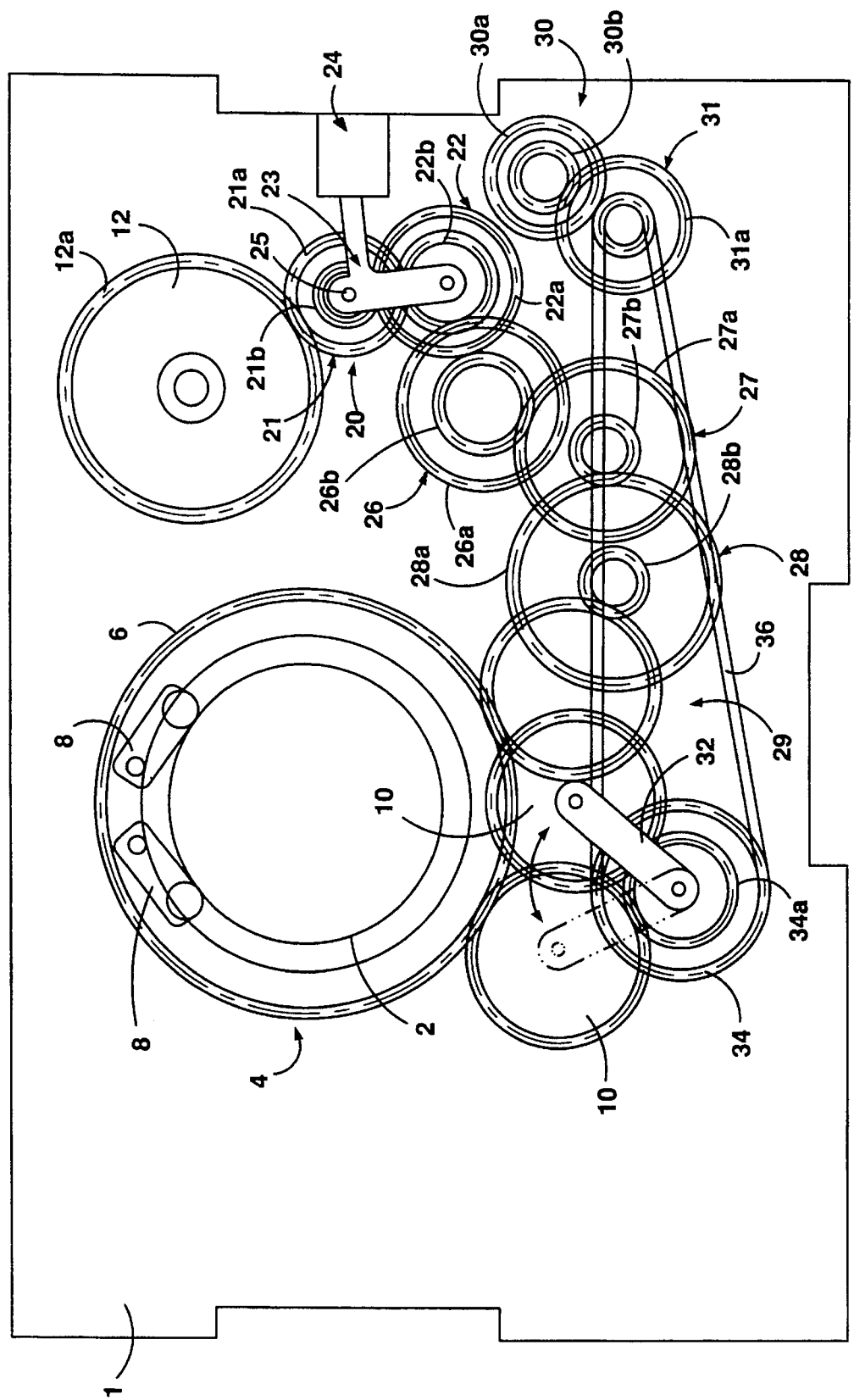
FIG. 1 is a schematic plan view showing a deck for illustrating a first embodiment of a power transmission device of a tape recorder according to the present invention.

Referring to a deck having a first embodiment of a power transmission device according to the present invention which is schematically shown in FIG. 1, a rotary drum 2 installed on the center of the deck 1 is provided with a plurality of heads (not shown) for recording and/or reproducing signals with respect to a tape. A tape loading unit 4 is placed around the outer circumference of the rotary drum 2 for moving the tape toward the rotary drum 2. The tape loading unit 4 preferably includes a ring gear 6, which moves pole bases 8 along a predetermined path in accordance with the rotation of the ring gear 6 to load the tape into proximity with the rotary drum 2.

Preferably, the deck 1 has a pair of reel tables (not shown) on which an tape cassette (not shown) is safely mounted. It will be noted that the reel tables are driven by means of an idler gear 10. The above-described tape loading unit 4 and idler gear 10 selectively deliver the rotational force of a capstan motor 12 disposed on the deck 1 by employing a power transmission device 20 to move the tape, thereby selectively loading the tape or driving the reel tables.

The power transmission device 20 has a transmission gear 21 and a rotating gear 22 both installed on a swing arm 23, in which a first gear 21 a of the transmission gear 21 is brought into meshing engagement with a gear 12a of the capstan motor 12, and a second gear 21b thereof is in meshing engagement with a first gear 22a of the rotating gear 22. The power transmission device 20, which functions by selectively delivering the power of the capstan motor 12 to the tape loading unit 4 and idler gear 10, is rotated from side to side around a shaft 25 by a positioning controller 24 provided on one side of the swing arm 23 of the power transmission device 20.

Preferably, the positioning controller 24 serves to selectively swing the swing arm 23 of the power transmission device 20 from left to right.

The power of the capstan motor 12 is transmitted to the tape loading unit 4 via a first power transmission device. The first power transmission device consists of a series of decelerating gears of first, second, third and fourth gears, 26, 27, 28 and 29, wherein a first gear 26a of the first gear 26 is selectively brought into meshing engagement with a second gear 22b of the rotating gear 22 in the power transmission device 20, and second gear 26b of the first gear 26 is in meshing engagement with a first gear 27a of the second gear 27. A second gear 27b of the second gear 27 is brought into meshing engagement with a first gear 28a of the third gear 28, and a second gear 28b of the third gear 28 is in meshing engagement, with the ring gear 6 of the tape loading unit 4 via fourth gear 29. Consequently, the power of the capstan motor 12 is transmitted to the first power transmission device by means of the power transmission device 20, and then properly decelerated by means of the first power transmission device to drive the tape loading unit 4, thereby permitting loading and unloading operations of the tape.

In addition to the first power transmission device, the power of the capstan motor 12 is also transmitted to the idler gear 10 via a second power transmission device. That is, the second power transmission device is formed such that the first gear 22a of the rotating gear 22 of the power transmission device 20 is selectively brought into meshing engagement with a first gear 30a of a relay gear 30, and a second gear 30b of the relay gear 30 is in meshing engagement in with a gear 31 a of a driving pulley 31.

Using a timing belt 36, the driving pulley 31 is connected to a driven pulley 34 which is connected to the idler gear 10 by an arm 32, and a gear 34a of the driven pulley 34 is in meshing engagement with the idler gear 10. Therefore, the power of the capstan motor 12 is transmitted to the idler gear 10 which in turn rotates the reel tables.

The operation of the power transmission device according to the first embodiment of the present invention will now be described in detail.

Once the tape cassette is mounted on the reel tables of the deck 1, a cassette-in sensor (not shown) perceives the seating of the tape cassette to rotate the capstan motor 12, and the positioning controller 24 allows the swing arm 23 of the power transmission device 20 to swing toward the first power transmission device. Since the second gear 22b of the rotating gear 22 provided in the power transmission device 20 is brought into meshing engagement with first gear 26a of the first gear 26 in the first power transmission device, the power of the capstan motor 12 is decelerated through the first to fourth gears 26, 27, 28 and 29 and transmitted to the tape loading unit 4, thereby permitting the loading and unloading operations of the tape.

It will be appreciated that the tape-loading speed can be set to an optimum state by suitably designing the deceleration ratio of the series of decelerating gears of the first power transmission device. As is well-known, speed-control sensors provided in the capstan motor 12 control the rotating speed of the capstan motor 12 to constantly and accurately control the tape loading speed of the tape loading unit 4.

After the tape is moved, i.e., once the tape loading is completed, the positioning controller 24 makes the swing arm 23 swing toward the relay gear 30 of the second power transmission device. By this operation, the first gear 22a of the rotating gear 22 provided in the power transmission device 20 is brought into meshing engagement with the first gear 30a of the relay gear 30, thereby rotating the relay gear 30. Accordingly, the power of the capstan motor 12 is transmitted to the idler gear 10 via the driving pulley 31 and driven pulley 34 which are linked to each other by means of the timing belt 36, and the idler gear 10 can rotate the reel tables.

Figure 2:
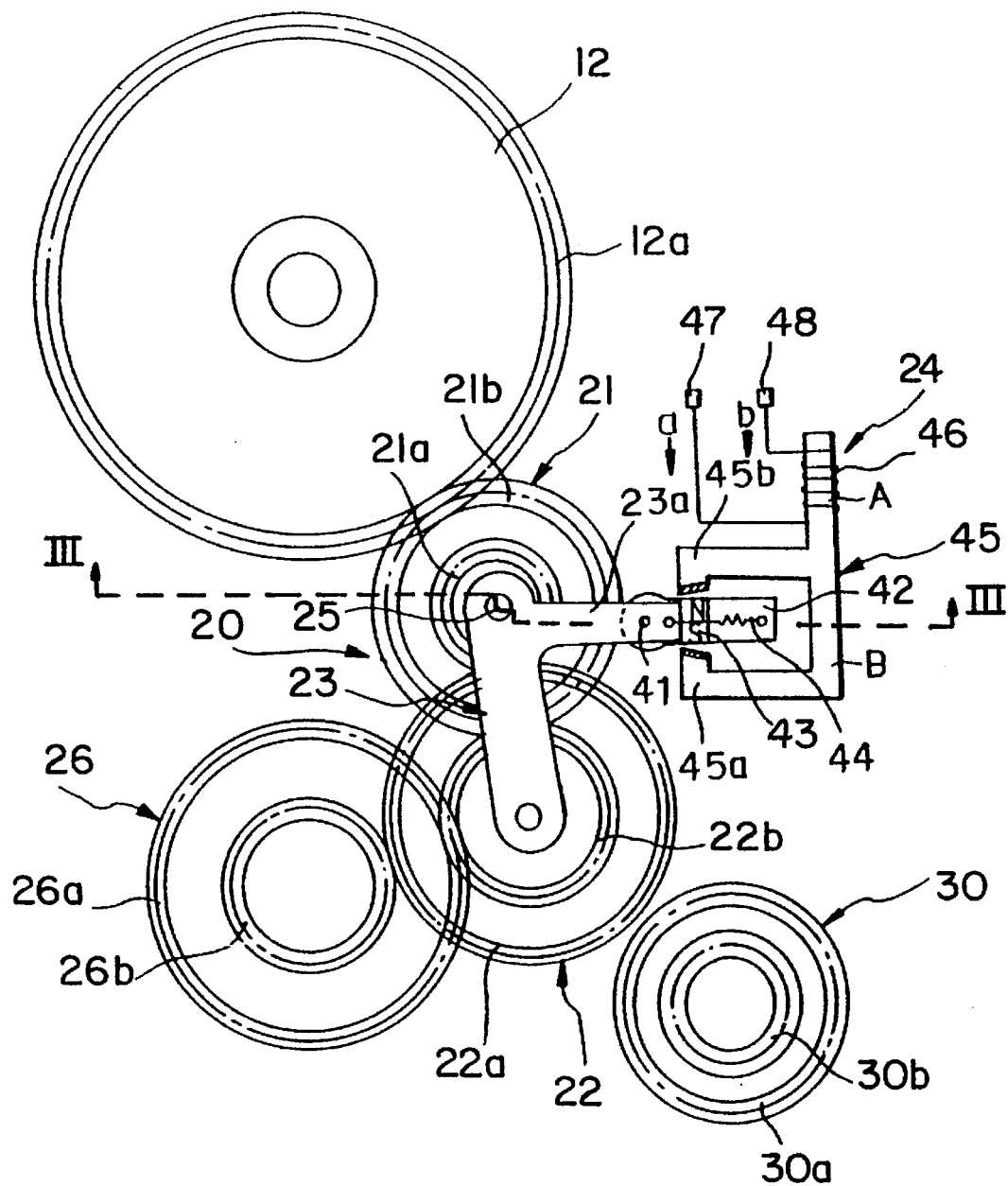
FIG. 2 is a view showing the construction of the principal portion of the power transmission device shown in FIG. 1.
Figure 3A:
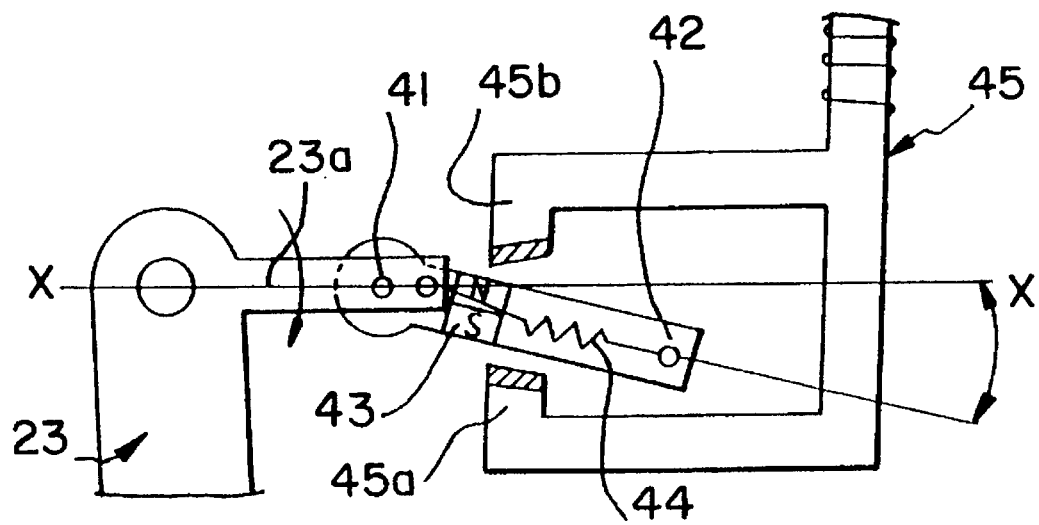
Figure 3B:
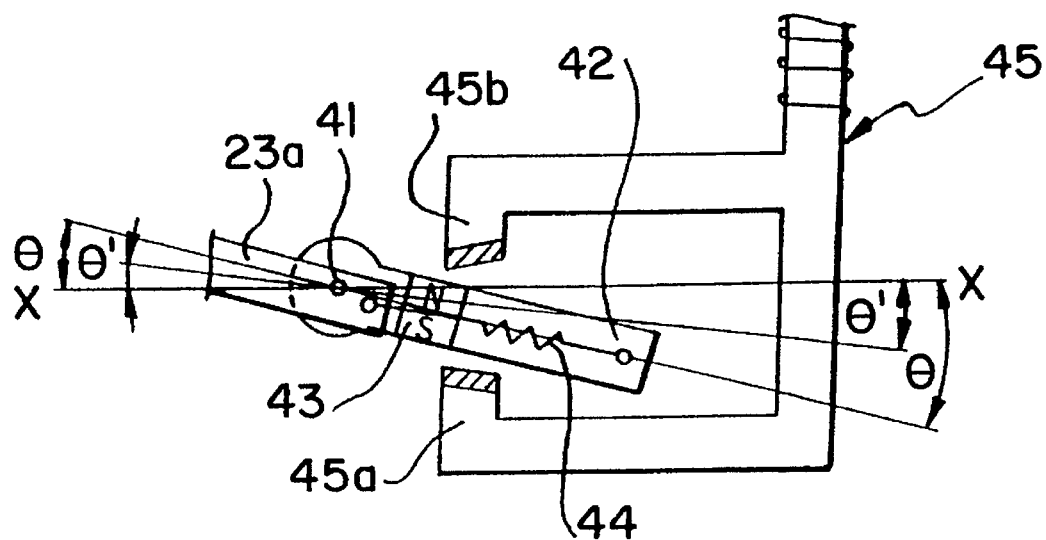
Figure 3C:
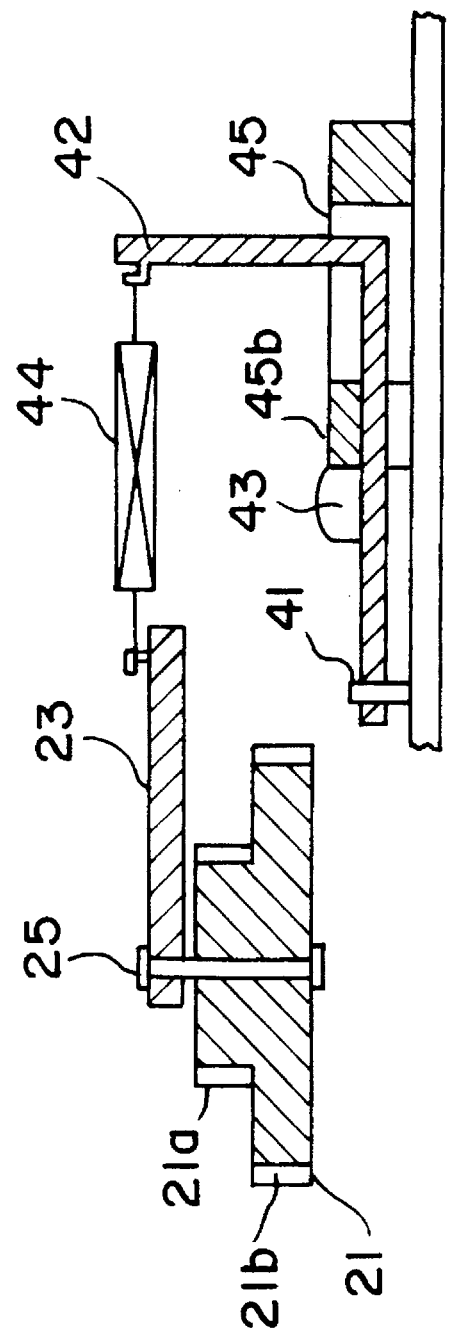
FIG. 3C is a side elevation view taken along the line III—III of FIG. 2.

The positioning controller 24 of FIG. 1 is illustrated in greater detail in FIG. 2, which includes a shaking lever 42 rotating about a pin 41 connected via a spring 44 to the end of a lever 23a projecting on one side of the swing arm 23 of the power transmission device 20. The shaking lever 42 has a permanent magnet 43 with N and S poles on a predetermined portion thereof. One end of the lever 23a of the swing arm 23 is elastically connected to one end of the shaking lever 42 by means of the spring 44 as shown in FIG. 3C.

The positioning controller 24 further includes an electromagnetic member 45 installed such that the permanent magnet 43 of the shaking lever 42 is disposed in close proximity to the air gap between first and second ends 45a and 45b of member 45. A coil 46 winds around one leg of the electromagnetic member 45 to permit both ends thereof to be connected to first and second terminals 47 and 48. The polarities of the A and B portions of the electromagnetic member 45 are changed in accordance with the direction of current flowing through the coil 46.

Now, the positioning controller shown in FIG. 2 will be described in detail.

As described above, once the tape cassette is mounted on the reel tables of the deck 1, the cassette-in sensor perceives the seating of the tape cassette and rotates the capstan motor 12. At the same time, a supplied voltage is applied to the first terminal 47 of the positioning controller 24 to allow the current to flow in the direction of an arrow "a" of the coil 46 shown in FIG. 2, so that the portion A of the electromagnetic member 45 has a polarity of S, and the portion B has a N polarity.

As a result, since the first and second ends 45a and 45b of the electromagnetic member 45 have the polarity of N, the N pole of the permanent magnet 43 provided on the shaking lever 42 is subjected to the mutually repulse magnetic force with the second end 45b, e.g., the N pole, whereas the S pole of the permanent magnet 43 is inclined to attract the first end 45a, e.g., the N pole. Thus, as shown in FIG. 3A, the shaking lever 42 swings toward the first end 45a by as much as "Θ", using a line X—X as a reference. Since the lever 23a of the swing arm 23 and shaking lever 42 are elastically connected by spring 44, the swing arm 23 is continuously pulled towards the distal end of shaking lever 42 and, the spring 44 draws the lever 23a into the state shown in FIG. 3A, swinging the lever 23a clockwise as much as "Θ", using the X—X as the reference.

When the lever 23a of the swing arm 23 swings clockwise as described above, the second gear 22b of the rotating gear 22 in the power transmission device 20 is brought into meshing engagement with the first gear 26a of the first gear 26 in the first power transmission device to transmit the power of the capstan motor 12 to the first power transmission device. The power, decelerated through the first to fourth gears 26 to 29, is delivered to the tape loading unit 4 to perform the loading and unloading operations of the tape.

In case of moving the tape under the fully loaded condition, the power supplied to the first terminal 47, as shown in FIG. 2, is supplied to the second terminal 48 to make the current flow in the direction "b" of coil 46. The portion A of the electromagnetic member 45 has the polarity of N, and the portion B thereof has a magnetic orientation of S, which is contrary to the results of supplying power to the first terminal 47.

When the polarity of the first and second ends 45a and 45b become S, the N pole of the permanent magnet 43 provided on the shaking lever 42, is attracted to the second end 45b, while the S pole of the permanent magnet 43 is repulsed by the magnetic force of the first end 45a. Accordingly, the shaking lever 42 shifts toward the second end 45b, producing a state contrary to that shown in FIG. 3A.

By doing so, the lever 23a of the swing arm 23 at the state shown in FIG. 3A swings counter-clockwise under the tension of the spring 44 to permit the first gear 22a of the rotating gear 22 to be brought into meshing engagement with first gear 30a of the relay gear 30 as shown in FIG. 2, with the consequence of blocking the power supply to the first power transmission device and shifting the power of the capstan motor 12 to the second power transmission device. Thus, the power is transmitted to the idler gear 10 through the driving and driven pulleys 31 and 34, so that the idler gear 10 can rotate the reel tables.

On the other hand, by swinging the shaking lever 42 of the positioning controller 24 by as much as, e.g., "Θ", in the state shown in FIG. 3A, the lever 23a swings as much as "Θ'" by the tension of the spring 44. In other words, the lever 23a and shaking lever 42 form an angle of "Θ—Θ'", which denotes the state of continuously drawing the lever 23a by the spring 44. As a result, even though the power supplied to the first and second terminal 47 and 48 is cut off, the lever 23a and shaking lever 42 advantageously can continuously swing. Therefore, the power of the capstan motor 12 can be transmitted to the selected first or second power transmission device regardless of blocking the power supplied to the first and second terminal 47, 48.

According to the first embodiment of the power transmission device of the tape recorder as described above, the power of the capstan motor is selectively transmitted to the first or second power driving unit via the power units, thereby loading the tape or driving the reel tables through the first and second power transmission devices.

FIG. 4 is a schematic plan view showing a second embodiment of the power transmission device according to the present invention. Here, like parts are designated by corresponding reference numerals described with reference to FIG. 2, of which description will thus be omitted.

Figure 5:
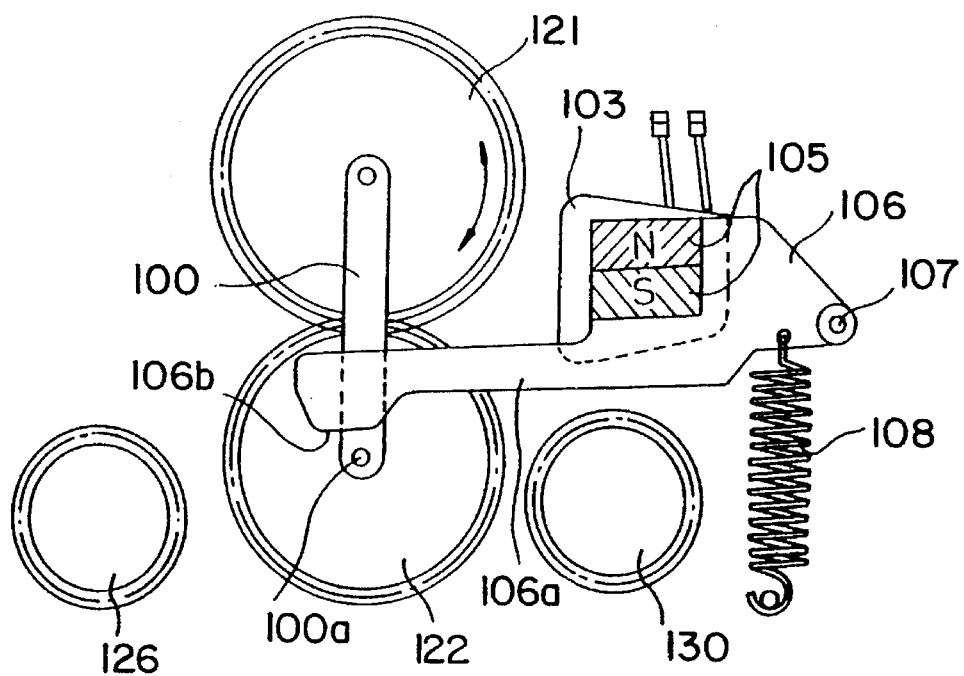
FIG. 5 is a view showing the construction of the principal portion of the power transmission device shown in FIG. 4.

In the second embodiment of the present invention as shown in FIGS. 4 and 5, a power transmission device 120 includes a transmission gear 121 in meshing engagement with the gear 12a of the capstan motor 12, a rotating gear 122 in meshing engagement with the transmission gear 121 connected by a lever 100. A first gear 126 and a relay gear 130 are installed on both sides of the rotating gear 122 for transmitting power toward the loading system or reel system via respective gears of the tape recorder as described above.

On one side of the power transmission device 120, as shown in FIGS. 5 to 8, a driving coil 104 is mounted on a substrate 103 of the deck 1, and a plunger 106 is installed over the driving coil 104 maintaining a predetermined distance such that a permanent magnet 105 having polarities of N and S installed on the plunger 106 is disposed opposite to the driving coil 104.

The plunger 106 can swing against a spring 108 around a shaft 107 at one end thereof, and a latch plate 106b is formed on the end of an arm 106a extending on the other end of the plunger 106. The latch plate 106b catches a pin 100a formed on one end of the lever 100 connecting the transmission gear 121 to rotating gear 122.

As shown in FIG. 4, the first gear 126 receives the power of the capstan motor 12 by the power transmission device 120 to transmit it to the tape loading unit 4 via the second, third and fourth gears 27, 28 and 29, thereby performing loading and unloading operations of the tape. The relay gear 130 is in meshing engagement with the gear 31a of the driving pulley 31 connected to the driven pulley 34 which is connected to the idler gear 10 via the arm 32, using the timing belt 36. The gear 34a of the driven pulley 34 is brought into meshing engagement with the idler gear 10 to transmit the power of the capstan motor 12, thereby rotating the reel tables.

The operation of the second embodiment of the present invention formed as above will be described below.

Once the tape cassette is seated on the reel tables on the deck 1, the cassette-in sensor (not shown) perceives the seating of the tape cassette to rotate the capstan motor 12, and the transmission gear 121 in meshing engagement with the gear 12a of the capstan motor 12 is rotated. If the transmission gear 121 rotates clockwise, the rotating gear 122 connected by means of the lever 100 swings and is brought into meshing engagement with the first gear 126 to transmit the power to the tape loading unit 4 via the second, third and fourth gears 27, 28 and 29, thereby loading and unloading the tape.

At this time, the tape loading speed can advantageously be set by suitably designing the deceleration ratio of the series of decelerating gears 126, 27, 28 and 29. Moreover, well-known speed-control sensors provided in the capstan motor 12 control the rotating speed of the capstan motor 12, thereby constantly and accurately controlling the tape loading speed.

It will be appreciate that if the transmission gear 121 rotates counter-clockwise, the rotating gear 122 connected by means of the lever 100 is moved toward the relay gear 130 and is brought into meshing engagement therewith, so that the idler gear 10 is driven by means of the driving pulley 31 and driven pulley 34 which are connected by the timing belt 36 to rotate the reel tables (not shown).

When transmitting the rotational force of the capstan motor 12 to the first gear 126 and relay gear 130 while using the power transmission device 120, the rotating gear 122 swings right or left in accordance with the rotational direction of the transmission gear 121 and is, thus, inclined to be in meshing engagement with one of the first gear 126 and relay gear 130. Consequently, if the rotational direction of the transmission gear 121 is changed at need under the state of being in meshing engagement with either one, the connection of the rotating gear 122 is altered.

Figure 6:
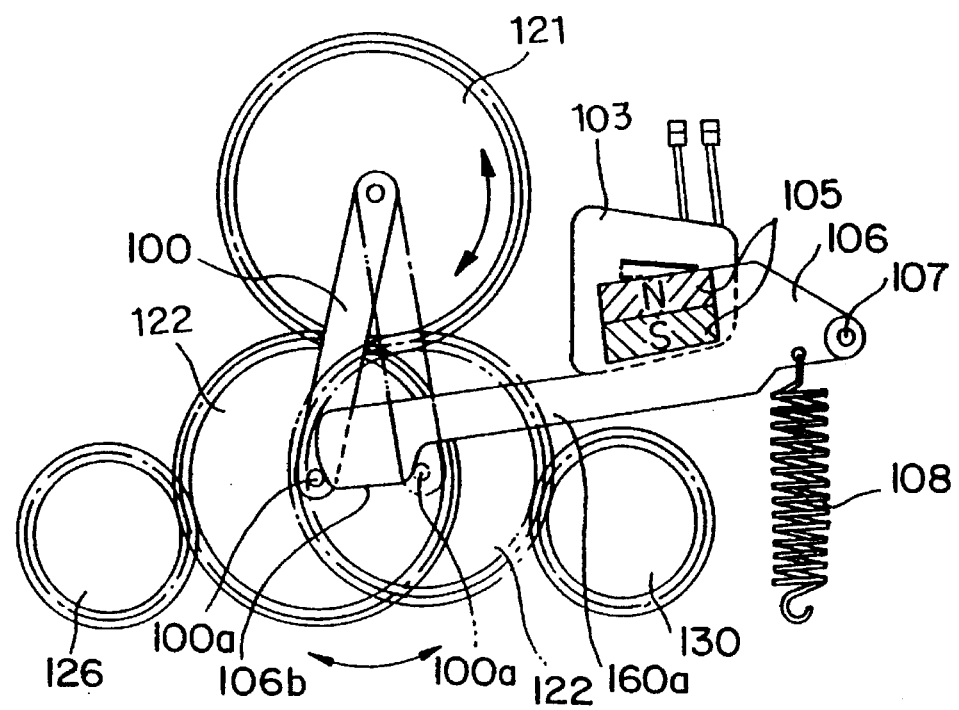
FIG. 6 is a view of the operational state of the power transmission device shown in FIG. 4.
Figure 7:
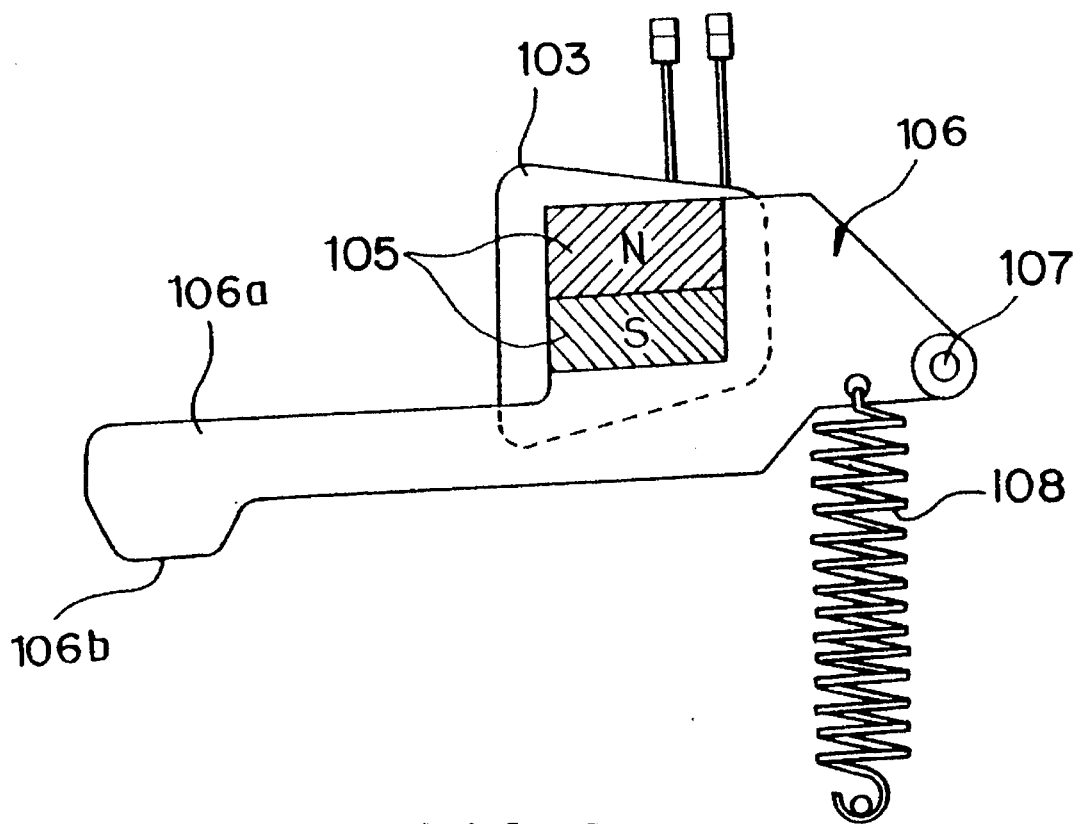
FIGS. 7 and 8 are a plan and a side elevational view, respectively, illustrating the construction of a plunger applied to the power transmission device according to the present invention.
Figure 8:
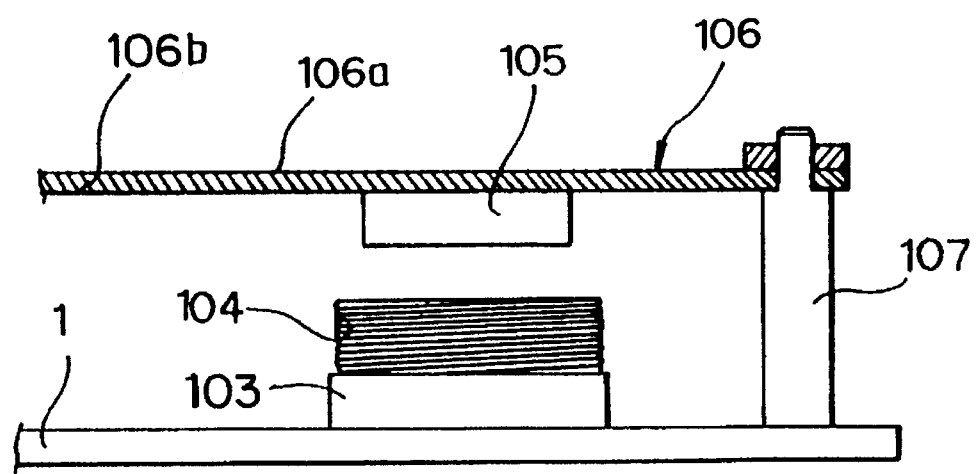
Figure 9:
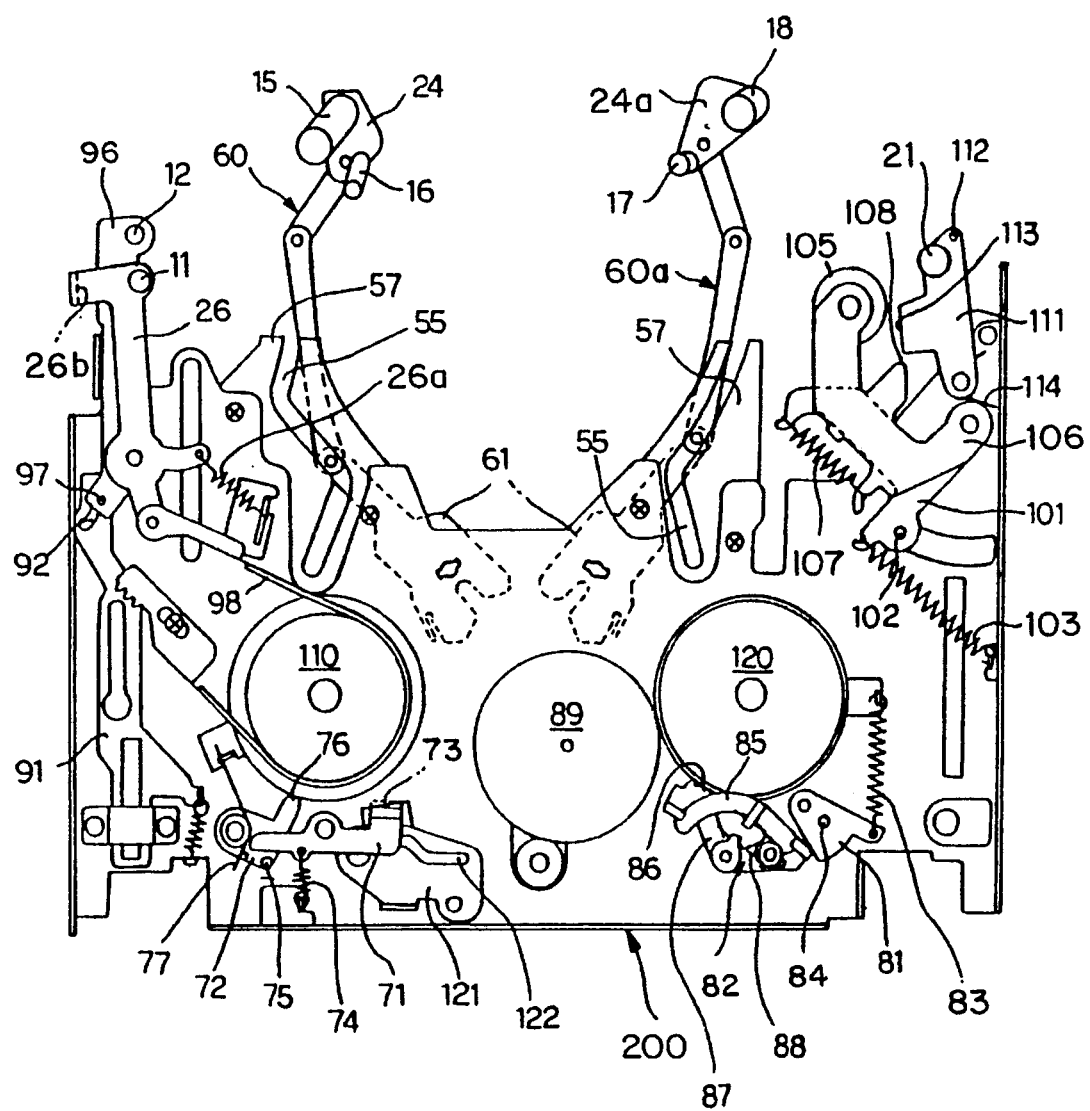
FIG. 9 is a view of selected component of a conventional tape recorder illustrating a reel drive system.

For this reason, according to the second embodiment of the present invention, the inclination of the rotating gear 122 to swing can be forcibly regulated by a positioning controller as shown in FIGS. 6, 7 and 8. In more detail, when the rotating gear 122 swings in response to change of modes while the rotating gear 122 is in meshing engagement with either the first gear 126 or relay gear 130 to carry out corresponding operating modes, the driving coil 104 on the substrate 103 is supplied with the power to interact with the permanent magnet 105 opposite thereto, so that the plunger 106 elastically moves clockwise around the shaft 107 against the spring 108, as shown in FIG. 5.

Thereafter, the rotating gear 122 swings without being interrupted and can be brought into meshing engagement with the other gear to perform its corresponding operating mode. At this time, the power supplied to the driving coil 104 is blocked to return the plunger 106 to its original position by the restoring force of the spring 108.

Then, since the latch plate 106b at the end of the arm 106a extending to one side of the plunger 106 catches the pin 100a on one portion of the lever 100, the rotating gear 122 cannot be swung in spite of changing the rotational direction of the transmission gear 121, thus securely transmitting the required power.

In the second embodiment of the power transmission device of the tape recorder according to the present invention as described above, the rotational force of the capstan motor can be properly transmitted to the loading or reel system. Furthermore, the required power can be necessarily transmitted by means of the positioning controller to improve the function of the tape recorder.

In short, due to the arrangement of shaft 107 and spring 108, the spring 108 moves the plunger 106 counterclockwise, i.e., the deenergized state of positioning controller 124. Thus, when power is provided to coil 104, plunger 106 is moved against the bias of spring 108 so that rotation of capstan motor 12 can be used to select between gears 126 and 130. When coil 104 is deenergized, spring 108 moves plunger 106 counterclockwise, thus locking gear 122 in position by means of engagement between pin 100a and latch plate 106b.

Preferably, the power of the capstan motor is selectively transmitted to the first and second power transmission devices via the power switching units, and the tape loading unit and reel tables are driven via the first and second power transmission devices. Here, the loading motor is removed when compared with the conventional deck, which enables the deck to be reduced to the minimum size and weight presently attainable. Moreover, the cost and the number of components advantageously are decreased, thereby improving the devices's productivity.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. In a power transmission device of a tape recorder for receiving a power from a capstan motor both to drive a tape loading system for loading a tape with respect to a drum and to drive a reel table system, said tape loading system being placed around an outer circumference of the drum and operative to move the tape toward the drum, the power transmission device of said tape recorder comprising:

power transmitting means formed of a transmission gear for performing forward and backward rotation in response to said capstan motor, and a rotating gear for swinging at a predetermined angle around a shaft, said rotating gear being in meshing engagement with said transmission gear;

first power driving means having a first gear mounted on a deck for transmitting a rotational force from said capstan motor to said tape loading system by being selectively brought into meshing engagement with said rotating gear;

second power driving means having a relay gear mounted on said deck for transmitting the rotational force from said capstan motor to said reel table system by being selectively brought into meshing engagement with said rotating gear; and position-control means for preventing said rotating gear from being deviated when driving a selected one of said first and second power driving means using said power transmitting means, wherein said tape loading system includes a ring gear and pole bases operative to move along a preset path in accordance with rotation of said ring gear to load the tape into proximity with the drum.

2. The power transmission device of a tape recorder as claimed in claim 1, wherein said power transmitting means comprises:

said transmission gear having a first transmission gear in meshing engagement with a gear at said capstan motor, and a second transmission gear in meshing engagement with a first rotating gear of said rotating gear;

said rotating gear having said first rotating gear being selectively brought into meshing engagement with said second transmission gear of said transmission gear and said relay gear of said second power driving means; and a swing arm pivotally mounted on the shaft and connecting said transmission gear to said rotating gear, said swing arm being connected to said position-control means.

3. The power transmission device of a tape recorder as claimed in claim 1, wherein said power transmitting means comprises:

a lever connecting said transmission gear to said rotating gear; and a pin projecting from an upper end of said lever at said rotating gear side.

4. The power transmission device for a tape recorder as claimed in claim 1, wherein said first power driving means comprises a series of decelerating gears consisting of a plurality of gears consecutively arranged for receiving the power from said rotating gear to drive said tape loading system.

5. The power transmission device of a tape recorder as claimed in claim 1, wherein said position-control means comprises:

a driving coil mounted on a substrate;

a plunger attached with a permanent magnet opposite to said driving coil and spaced apart therefrom by a predetermined distance, said plunger being pivotally mounted on a second shaft; and a spring connected to said plunger, whereby said plunger swings around said second shaft to regulate a position of said rotating gear.

6. The power transmission device of a tape recorder as claimed in claim 5, wherein said plunger comprises a latch plate on one end of an arm extending to one side thereof to control a position of a projecting pin formed on a lever connecting said transmission gear with said rotating gear.

7. The power transmission device of a tape recorder as claimed in claim 6, wherein said plunger swings around said second shaft to release a projecting pin position when an electric power is applied to said driving coil, and controls the position of said projecting pin using a restoring force of said spring when the electric power is turned off.

8. The power transmission device of a tape recorder as claimed in claim 2, wherein said position-control means comprises:

a shaking lever rotatably connected to an end of a lever projecting on one side of said swing arm of said power transmitting means via a pin;

a permanent magnet for swinging said shaking lever by a predetermined angle;

a spring connecting one end of said lever of said swing arm to one end of said shaking lever; and an electromagnetic member having first and second ends close to said permanent magnet coupled to said shaking lever.

9. The power transmission device of a tape recorder as claimed in claim 8, wherein said electromagnetic member comprises:

a body mounted on a substrate, and a driving coil wound about said body for supplying a predetermined current, whereby the polarity of said first and second ends is determined by the current supplied to said coil.

10. In a power transmission device of a tape recorder for receiving a power from a capstan motor both to drive a tape loading system for loading a tape with respect to a drum and to drive a reel table system, the power transmission device of said tape recorder comprising:

power transmitting means formed of a transmission gear for performing forward and backward rotation in response to said capstan motor, and a rotating gear for swinging at a predetermined angle around a shaft, said rotating gear being in meshing engagement with said transmission gear;

first power driving means having a first gear mounted on a deck for transmitting a rotational force from said capstan motor to said tape loading system by being selectively brought into meshing engagement with said rotating gear;

second power driving means having a relay gear mounted on said deck for transmitting the rotational force from said capstan motor to said reel table system by being selectively brought into meshing engagement with said rotating gear; and position-control means for preventing said rotating gear from being deviated when driving a selected one of said first and second power driving means using said power transmitting means, wherein said second power driving means comprises:
said relay gear for receiving the power from said power transmitting means;
a driving pulley which is in meshing engagement with said relay gear;
a driven pulley which is in meshing engagement with an idler gear; and
a timing belt connecting said relay gear and said idler gear for transmitting said power from said relay gear to said idler gear.

11. A power transmission device for a tape recorder and which selectively supplies power from a capstan motor for driving one of a tape loading system for positioning a tape with respect to a drum and a reel table system, said tape loading system being placed around an outer circumference of the drum and operative to move the tape toward the drum, comprising:

a transmission gear rotating about a first shaft responsive to forward and backward rotation by said capstan motor;

a rotating gear in meshing engagement with said transmission gear for swinging through a predetermined angle around said shaft, wherein a direction of said swinging through said angle is based on a direction of said rotation of said capstan motor;

a first gear mounted on a deck receiving a rotational force transmitted from said capstan motor through said rotating gear for powering said tape loading system;

a relay gear mounted on said deck receiving rotational force from said capstan motor for powering said reel table system; and a position-controller for preventing said rotating gear from being deviated when selectively driving one of said first gear and said relay gear, wherein said tape loading system includes a ring gear and pole bases operative to move along a preset path in accordance with rotation of said ring gear to load the tape into proximity with the drum.

12. The power transmission device as claimed in claim 11, further comprising a swing arm connecting said transmission gear to said rotating gear, said swing arm swinging about said shaft controlled responsive to said position-controller.

13. The power transmission device as claimed in claim 12, wherein said position-controller comprises:

a driving coil mounted on a substrate; and a plunger comprising a permanent magnet positioned opposite to said driving coil and spaced apart therefrom by a predetermined distance, whereby said plunger swings around a second shaft to regulate the position of said swing arm.

14. The power transmission device as claimed in claim 13, wherein said plunger comprises a latch plate on one end of an arm extending to one side thereof to control the position of a projecting pin included on said swing arm.

15. The power transmission device as claimed in claim 13, wherein said plunger swings around said second shaft to release a projecting pin on said swing arm when an electric power is applied to said driving coil, and fixes the position of said projecting pin when said driving coil is deenergized.

16. The power transmission device as claimed in claim 12, wherein said position-controller comprises:

a shaking lever rotatably connected to an end of a lever projecting on one side of said swing arm via a pin;

a permanent magnet for swinging said shaking lever through a predetermined angle;

a spring operatively connecting said pin and one end of said shaking lever; and an electromagnetic member having first and second ends close to said permanent magnet of said shaking lever.

17. The power transmission device as claimed in claim 16, wherein said electromagnetic member comprises:

a body mounted on a substrate; and a driving coil wound about said body and receiving a predetermined current, whereby magnetic orientation of said first and second ends is determined responsive to a polarity of said current so as to permit interaction between said permanent magnet and said first and second ends.

18. In a power transmission device of a tape recorder for receiving a power from a capstan motor both to drive a tape loading system for loading a tape with respect to a drum and to drive a reel table system, the power transmission device of said tape recorder comprising:

power transmitting means formed of a transmission gear for performing forward and backward rotation in response to said capstan motor, and a rotating gear for swinging at a predetermined angle around a shaft, said rotating gear being in meshing engagement with said transmission gear;

first power driving means having a first gear mounted on a deck for transmitting rotational force from said capstan motor to said tape loading system by being selectively brought into meshing engagement with said rotating gear;

second power driving means having a relay gear mounted on said deck for transmitting the rotational force from said capstan motor to said reel table system by being selectively brought into meshing engagement with said rotating gear; and position-control means for preventing said rotating gear from being deviated when driving a selected one of said first and second power driving means using said power transmitting means, wherein said power transmitting means comprises:

a lever connecting said transmission gear to said rotating gear; and a projecting pin which projects from an upper end of said lever at said rotating gear side, and further wherein said position-control means comprises:

a driving coil mounted on a substrate;

a plunger attached with a permanent magnet opposite to said driving coil and spaced apart therefrom by a predetermined distance, said plunger being pivotally mounted on a second shaft, said plunger comprising a latch plate on one end of an arm extending to one side thereof to control the position of said projecting pin formed on said leyer connecting said transmission gear with said rotating gear; and a spring connected to said plunger, whereby said plunger swings around said second shaft to release the position of said projecting pin when said driving coil is energized, and controls the position of said projecting pin using a restoring force of said spring when said driving coil is deenergized, thereby to regulate a position of said rotating gear.

* * * * *